United States Patent [19]

Kruse

[11] Patent Number: 5,112,398
[45] Date of Patent: May 12, 1992

[54] JET PRINTING INK

[75] Inventor: Jurgen M. Kruse, Clinton, Conn.

[73] Assignee: Xaar Limited, Cambridge, England

[21] Appl. No.: 676,190

[22] Filed: Mar. 27, 1991

Related U.S. Application Data

[63] Continuation-in-part of Ser. No. 366,636, Jun. 15, 1989, abandoned.

[51] Int. Cl.$^5$ .............................................. C09D 11/02
[52] U.S. Cl. ...................................... 106/20; 524/376; 524/377; 524/485; 524/563
[58] Field of Search ................. 106/22, 20; 524/376, 524/377, 485, 563

[56] References Cited

U.S. PATENT DOCUMENTS

| | | | |
|---|---|---|---|
| 4,157,973 | 6/1979 | Montillier | 252/62.1 L |
| 4,338,133 | 7/1982 | Toyoda et al. | 106/22 |
| 4,361,843 | 11/1982 | Cooke et al. | 346/1.1 |
| 4,386,961 | 6/1983 | Lin | 106/22 |
| 4,390,369 | 6/1983 | Merritt et al. | 106/31 |
| 4,490,177 | 12/1984 | Shioi et al. | 106/23 |
| 4,834,799 | 5/1989 | Song | 106/22 |
| 4,849,773 | 7/1989 | Owatari | 346/140 R |
| 5,010,125 | 4/1991 | Kruse et al. | 524/308 |

FOREIGN PATENT DOCUMENTS

| | | |
|---|---|---|
| 62444 | 10/1982 | European Pat. Off. |
| 99682 | 2/1984 | European Pat. Off. |
| 176228 | 4/1986 | European Pat. Off. |
| 181198 | 5/1986 | European Pat. Off. |
| 187352 | 7/1986 | European Pat. Off. |
| 206286 | 12/1986 | European Pat. Off. |
| 3203782 | 4/1982 | Fed. Rep. of Germany |
| 54-005729 | 1/1979 | Japan |

*Primary Examiner*—William R. Dixon, Jr.
*Assistant Examiner*—Helene Klemanski
*Attorney, Agent, or Firm*—Marshall, O'Toole, Gerstein, Murray & Bicknell

[57] ABSTRACT

An ink jet ink composition and method of printing on plain paper are provided wherein the composition comprises a mixture of a nonaqueous solvent (e.g. selected glycol ethers), a resin (e.g. an ethylene-vinyl acetate copolymer) which is substantially completely soluble in the solvent at elevated operation temperatures but substantially insoluble in the solvent at room temperature and a dyestuff which is soluble in the resin at room temperature and above but substantially insoluble in the solvent at room temperature. The ink composition is fluid at room temperature, and has very low viscosity at elevated operating temperatures.

17 Claims, No Drawings

JET PRINTING INK

CROSS-REFERENCE TO RELATED APPLICATION

This is a continuation-in-part of copending, commonly assigned application Ser. No. 07/366,636 filed Jun. 15, 1989 abandoned.

BACKGROUND OF THE INVENTION

Printing according to the "ink jet printing" principle, and apparatus for carrying out such printing operations, are well known. In general terms, a fluid ink is forced, under pressure and often at an elevated temperature, through a very small orifice in a printing head.

In so-called "continuous" jet printing operations, ink droplets are passed through a charging area wherein individual droplets receive an electrical charge in response to a signal. The droplets then pass through an electrical field, causing a varied deflection of the individual droplets dependent on the intensity of the charge and field. The droplets are produced continuously, and are directed to the substrate to be printed or, alternatively, to a by-pass gutter.

Due to the nature of the "continuous" jet printing process, inks used therein must be conductive so as to accept a charge. Such inks are generally water based, as aqueous solutions or dispersions are easily rendered conductive. Water based inks are generally characterized as having a low viscosity (which tends to vary with temperature) and high volatility. Both characteristics can be disadvantageous.

If the viscosity of a jet printing ink is excessively low, misting and the production of stray droplets can result, which in turn result in poor print quality. High volatility of a jet printing ink can result in clogging of jet nozzles due to evaporation.

Water-based inks are capable of use on plain paper (i.e. a paper not bearing a pigment coating) and are capable of providing a high dye concentration on the surface of the paper so that it is possible to produce fine sized droplets and to avoid build-up of dyestuff on the substrate surface while providing high color intensity.

So-called "drop on demand" (DOD) systems differ from continuous jet printing systems in that ink droplets are expelled from the nozzle of a printing head only when required during the printing process.

In a DOD printing system, ink is provided from a reservoir via a supply system, to a nozzle/actuator system in the printing head. The actuators are generally of the piezoelectric or bubble type, and pressurize ink upon activation to force this ink from a chamber defined by the actuator through an associated jet nozzle associated therewith.

Since inks used in DOD Systems need not be conductive, and preferably are non-conductive, they have generally been formulated using primarily non-aqueous solvents such as ethylene glycols, particularly diethylene glycols, which are characterized as having low volatility. As such, ethylene glycol and similar solvent based inks do not evaporate quickly and, thus, exhibit reduced clogging problems. By a non-conductive ink is meant an ink which is substantially free of ionisable material.

However, ethylene glycol and other non-aqueous solvents have a relatively high viscosity (which varies significantly with temperature) and thus require relatively more energy for production of droplets.

Solvent based inks exhibit desirable drying characteristics and are biologically stable while water based inks generally tend to sorb air from the environment and are susceptible to biological fouling.

Another class of inks used in jet printing are referred to in the art as "hot melt" inks and comprise wax or other thermoplastic materials such that the ink is solid or semisolid at ambient temperatures but fluid at elevated temperatures. The heated ink fluid solidifies when it comes in contact with a paper target.

Such inks generally tend to exhibit excellent dye stability, lightfastness, and low solvent volatility. However, these inks accommodate only relatively low dye concentration and therefore necessitate the production of relatively large drops in order to provide acceptable color intensity. Also, the thermoplastic component of such inks tends to form raised spots which are easily smeared by rubbing.

Hot melt jet inks tend to be highly viscous and thus require high energy input in order to eject the drop from the printer nozzle. Also, since the entire ink must be rendered fluid by heating, high energy inputs and lengthy time periods are required to reach the printer operating temperature.

SUMMARY OF THE INVENTION

It is an object of the invention to overcome one or more of the problems described above.

According to the present invention, a jet printing ink composition is provided which comprises a mixture of a non-aqueous solvent, an amount of resin which is capable of being substantially completely dissolved in the solvent at elevated jet printer operating temperatures but which is substantially insoluble in the solvent at room temperature, and a dyestuff which is soluble in the resin at room temperature and above but substantially insoluble in the solvent at room temperature. The proportions of solvent, resin and dye are chosen such that the ink is fluid at room temperatures, and the solution of dye and resin is highly solvated by the solvent at printer operating temperatures. Upon ejection from the printer onto a paper substrate, the resin and the dyestuff precipitate or gel on the substrate surface and the solvent is absorbed into the substrate.

The ink composition of the invention is useful on a wide variety of plain papers, facilitates the production of fine droplets without the production of easily smudged raised spots, facilitates mixing of colors, provides high color intensity, and is economical in that it requires only a low amount of energy for heating to operating temperature, and allows the use of low ejection temperatures.

A method of forming an ink jet composition is also provided.

Other objects and advantages of the invention will be apparent to those skilled in the art from a review of the following detailed description taken in conjunction with the appended claims.

DETAILED DESCRIPTION OF THE INVENTION

The inventive jet ink composition exhibits many of the advantages of prior solvent-based, water based, and hot melt jet printing inks while eliminating important disadvantages associated with each of these types of inks. The inventive ink exhibits excellent dye stability, water fastness, low solvent volatility, and lightfastness associated with prior hot melt inks, yet exhibits desirable drying characteristics and excellent biological stability such as exhibited by prior solvent-based inks.

Similar to many water-based inks, the inventive ink composition is compatible with plain paper (i.e. paper which is free of a pigment coating) and is capable of providing a high dye concentration on the surface of a paper target.

The inventive jet ink composition comprises a mixture of a non-aqueous solvent, an amount of resin which is capable of being substantially completely dissolved in the solvent at ink jet printer operating temperature of about 50° C. and above but is substantially insoluble in the solvent at room temperature, and a dyestuff which is soluble in the resin at room temperature and above but substantially insoluble in the solvent at room temperature. The respective proportions of the solvent, resin, and dye are selected to provide an ink composition which is fluid at room temperature and wherein the solution of dye in resin is highly solvated by the solvent at printer operating temperatures of 50° C. and above.

THE SOLVENT

The solvent is selected to provide a low viscosity composition at operating temperatures (typically 50°–65° C.) but to allow the resin and dye to precipitate or gel on cooling to temperatures below the printer operating temperature (e.g. ambient or room temperature, such as about 20°–30° C., generally about 25°–30° C.). The solvent should allow the resin to be redissolved on rewarming, and must be rapidly absorbed (i.e. wicked) into the paper substrate. The solvent should have a relatively high boiling point (i.e. one significantly higher than operating temperature) to prevent evaporation and consequent deposition of resin in the jet printing nozzle, which can result in clogging.

The selection of a solvent is made in conjunction with the selection of the resin. As described in detail below, ethylene-vinyl acetate copolymer (EVA) resins are highly preferred. For such resins, alcohols and polyols such as ethylene glycol and diethylene glycol are not suitable since EVA is insoluble therein.

For use with the preferred EVA resins, useful solvents include generally one or more propylene glycol ethers or ethylene glycol butyl ethers in which the solubility requirements of the resin as described herein are satisfied.

Such solvents include dipropylene glycol ethers, tripropylene glycol ethers, ethylene glycol butyl ethers, diethylene glycol butyl ethers and triethylene glycol butyl ethers. Propylene glycol alkyl ethers such as dipropylene glycol monomethyl ether and tripropylene glycol monomethyl ether are preferred, with tripropylene glycol monomethyl ether being highly preferred.

Glycol ethers such as dipropylene glycol methyl ether (boiling point 188° C.) and tripropylene glycol methyl ether (boiling point 242° C.) perform very well and exhibit cloud points using typical concentrations of a preferred ethylene-vinyl acetate resin of 48° and 45° C., respectively. These cloud points are substantially above ambient temperatures, ensuring that the EVA resin will be substantially completely insoluble in such solvents at ambient conditions, but are below preferred operating temperatures of 50°–65° C., ensuring that the resin will be solubilized during printer operation.

Solvents which are suitable for use according to the invention are available commercially from several suppliers, including Dow Chemical U.S.A. of Midland, Mich. under the trade designation "Dowanol." Tripropylene glycol monomethyl ether is designated "Dowanol TPM." Dipropylene glycol monomethyl ether is available under the designation "Dowanol DPM." Ethylene glycol n-butyl ether is sold under the designation "Dowanol EB", and diethylene glycol n-butyl ether is designated "Dowanol DB." Triethylene glycol n-butyl ether is available as "Dowanol TBH."

Some hydrocarbon solvents are also usable in the present invention. Paraffinic hydrocarbons (e.g. Sunthene 204, marketed by Sun Refining and Marketing Co., boiling point 150° C.) or mixed paraffinic-naphthenic hydrocarbons (e.g. Vista LPA 210, sold by Vista Chemical Co., boiling point 240° C. and Sunpar LW 104, sold by Sun Refining and Marketing Co.) are suitable. In general, however, paraffins and mixed paraffin-naphthenic hydrocarbons are not preferred since they tend to render paper substrates transparent when sorbed therein, and the solvents are not sorbed into the paper fibers so that the drop volume is limited.

For use with EVA resins, solvent such as dimethylformamide or tetrahydrofuran are not acceptable since the dyestuff tends to be more soluble than in the resin and thus is sorbed into the paper with the solvent. This sorption results in lateral dot wicking and lower optical density.

THE RESIN

For use in the invention, one or more resins which are soluble in the solvent at jet printer operating temperatures of about 50° C. and above, and preferably at temperatures of about 45° C. and above at the desired concentration but substantially insoluble in the solvent at room temperature (e.g. 25°–30° C.) are selected. The resin should readily redissolve in the solvent upon warming and preferably will adhere well to the paper substrate. The resin should be optically clear, and hold the selected dyestuff in solution both at ambient and elevated temperatures. Thus, the dyestuff is associated with the resin in the ink when the ink is in an ink jet printer head at printer operating temperatures and remains associated with the resin when the ink is deposited on the paper surface at ambient temperatures.

Rapid dissolution and redissolution are facilitated by the use of low melting point resins.

Ethylene-vinyl acetate copolymer resins are highly preferred for use in the invention. EVA resins, especially those having relatively high vinyl acetate contents of greater than 35 wt. %, preferably 40 wt. %, adhere extremely well to cellulosic substrates and have softening points which can be varied from just above ambient temperatures to higher temperatures by varying the vinyl acetate content. Ethylene vinyl acetate resins are extremely soluble at elevated temperatures in various organic solvents useful in the invention. Solubility of these resins is a function of vinyl acetate content and molecular weight. Increasing vinyl acetate content and decreasing molecular weight increases solubility. If the vinyl acetate content is too low, the resin may not dissolve in the solvent. However, if it is too high, the resin may be soluble at ambient temperatures. A preferred EVA resin has about 40 wt. % vinyl acetate content and is sold by DuPont under the trademark ELVAX 40 W. Ethylene-vinyl acetate resins having 35 wt. % or greater vinyl acetate content sold by Quantum Chemical Corporation, USI Division are also suitable.

THE DYESTUFF

The dyestuff is selected to be soluble in the resin at room temperature and above but substantially insoluble in the solvent at room temperature. By the dyestuff being soluble in the resin or the resin holding the dyestuff in solution, we mean that the dyestuff and resin will form a true solution or at least that the dyestuff and resin are bound together by intermolecular forces such as hydrogen bonds or Van der Waal's forces. A wide variety of dyestuffs are useful and many of those characterized as "pigment dyes" in The Colour Index are satisfactory. Since the dyestuff is soluble in the resin, mixing of hues on the paper surface is facilitated. The dyestuff is preferably of a primary subtractive hue. The dyestuff should be lightfast, and thermally stable even with repeated warming. The dyestuff should be water insoluble once applied to the substrate to prevent smearing upon contact with water containing substances. The density of the dyestuff should be such that it does not precipitate from the ink on standing and the particle size should be appropriate for ink jet printing applications.

Dyes which have been found to be useful include Pigment Green 7, Direct Blue 15, Pigment Yellow 17, Pigment Yellow 83, Pigment Yellow 12, Pigment Black 2, Pigment Black 5, Pigment Black 7, Pigment Red 17, Pigment Red 23, Pigment Red 57 and Pigment Red 112 and the Ciba Geigy Microlith Series which includes Black, Red, Blue, Green and Gold. Pigment Blue 15-6 is a preferred dyestuff.

Other useful dyes include Cyan Blue BNF, Imperial Sacandaga Yellow and Lithol Rubine. These dyes are especially suitable in combination with ELVAX 40 W EVA resin and TPM solvent.

PROPORTIONS OF INGREDIENTS AND PHYSICAL CHARACTERISTICS OF THE COMPOSITION

According to the invention, the proportions of the solvent, resin and dye are selected to provide an ink composition which is fluid at room temperature, and which has a suitably low viscosity at operating temperatures (usually 50°-65° C.).

Although the ink composition is fluid at room temperature, preferred ink compositions (e.g. comprising 5 wt. % ELVAX 40 W EVA in DPM) exhibit non-Newtonian behaviour at ambient conditions. This is advantageous in that the ink composition behaves as a gel during storage or when quiescent, e.g. in the print head, at ambient conditions, but will flow when shear force is applied. This is ideal for storage and reduces the possibility of leakage from the printhead if subjected to shock.

The preferred ink composition will typically exhibit a low viscosity (i.e. in the range of 90-4000 cps) at ambient conditions, but when heated to about 55° C. will normally have a viscosity below about 30 cps, e.g. 15-30 cps, (as measured on a Brookfield Viscometer). At 55° C. the ink behaves like a solvent ink rather than a hot melt ink.

Preferably, the viscosity of the ink at operating temperature will be in the range of 10-30 cps, typically 25 cps or lower.

The ink is characterized by high dye absorptivity, resulting in high colour intensity, and thus allows the use of relatively low dye concentrations.

Although the respective proportions of dyestuff, resin, and solvent are widely variable and may be selected by the user empirically depending upon the intended purpose, it is preferred that the resin comprise about 7 wt. % or less of the ink composition, highly preferably in the range of 5-7%, with the total of dye and resin being about 10 wt. % or less of the composition.

The weight proportion of resin to dye is preferably low, such as about 3:2 or slightly more. This prevents a buildup of resin on the target surface, allows ready mixing of hues, and provides extremely good color intensity. At the same time, the advantages associated with deposition of the resin and dye on the paper surface are retained.

Preferably, the precipitate or gel deposited on the paper surface after cooling and absorption of solvent into the paper will comprise about 25-65 wt. % dye.

With reference to a preferred ELVAX 40 W EVA resin/DPM solvent system, a preferred composition is 4 to 6 wt. % ELVAX 40 W resin and a dye to resin ratio (W/W) of up to 2:3. Thus, to obtain a dye concentration of 3 wt. % in the ink composition, an ELVAX 40 W resin concentration of 4.5-5% is preferred. Lower ELVAX 40 W resin levels exhibit non-Newtonian behavior, while higher levels are disadvantageous in that they result in higher viscosities.

When TPM is used as a solvent, the maximum ratio of dye to resin is about 3:4. Thus, in order to obtain a dye concentration of 3 wt. % in the ink composition, an ELVAX 40 W resin concentration of 4 wt. % or slightly more should be used.

Higher resin concentrations result in viscosities greater than 20 cps. However, an Elvax 40 W resin concentration range of 3.5-5.5 wt. % is possible, especially if the dye concentration is dropped to 2.5 wt. %.

The choice of proportions will depend on the viscosity requirements of the ink jet apparatus and the required dye characteristics.

The ink compositions of the invention may be formed by incorporating the chosen resin and dye, or dyes, in the solvent in the chosen concentrations. One suitable method comprises dissolving the resin in pre-heated solvent, adding the dye to the solution and then quenching the composition while stirring it.

In the ink compositions of the invention, at ambient temperature the resin is insoluble in the solvent and the dyestuff is in solution in the resin, or at least bound to it as described above. At the operating temperature of 50° C. and above, usually 50°-60° C., the solution of dye and resin is in a highly solvated state in the solvent.

EXAMPLES

The practice of the present invention will be illustrated by reference to the following specific examples, which are illustrative in nature and are not to be considered as limiting the scope of the invention.

Example 1—Screening of Solvents

A series of trail ink composition formulations were prepared in order to determine useful solvents for use with ELVAX 40W EVA resin and Pigment Black dyestuff. Each trial composition contained 5 wt. % ELVAX 40W EVA resin, and 2 wt. % Pigment Black dyestuff, the remainder being the trial solvent.

Initial screening was conducted to identify solvents in which the EVA resin is soluble at 5 wt. % concentration at 50° C. and in which the Pigment Black dyestuff was insoluble at room temperature.

EVA was not soluble in acetone, Texanol (an aliphatic ester alcohol made by Eastman Kodak), 2-methyloxyethanol, dimethyl formamide (DMF), p-dioxane, monoethanolamine, and propylene glycol. Thus, these candidate solvents were not tested further.

Although the EVA resin was soluble in hot tetrahydrofuran (THF) the resin and the dyestuff were both soluble in THF at room temperature and thus THF is not a suitable solvent.

For those candidate solvents in which the resin was soluble at 50° C. but insoluble at room temperature and for which the dyestuff was also insoluble at room temperature, the cloud point was determined. The cloud point is the temperature at which the solubilized resin begins to precipitate from the solution, and is detectable optically. Selection of a solvent for a particular system will depend at least in part on the ejection temperature at which the ink is to be used. It is necessary that the ejection temperature be greater, and preferably substantially greater, than the cloud point in order to ensure that the resin will be completely soluble at operation temperatures. However, the cloud point should be sufficiently above room temperature (20°-30° C., nominally 25° C.) to ensure that the resin is completely insoluble in the resin at room temperature.

The cloud points for the trial ink systems using 5 wt. % ELVAX 40 W EVA resin and 2 wt. % Pigment Black dyestuff in the indicated solvent are shown below in Table I.

TABLE I

Cloud Points for Canditate
Ink Compositions Containing Solvent, 5 Wt. %
ELVAX 40W EVA Resin, and 2 Wt. % Pigment Black

| Solvent | Cloud Point (°C.) |
|---|---|
| Ethyl Acetate | 39 |
| Benzyl Alcohol | 47 |
| Cyclohexanone | <28 |
| Xylene | <28 |
| Sunpar LW 104 | 45 |
| Sunthene 204 | 40 |
| Vista LPA-210 | 44 |
| Kerosene | 33 |
| Butyl Cellosolve | 49 |
| Ethylene Glycol Propyl Ether | 47 |
| Tributyl Phosphate | 38 |
| Methyl Isobutyl Ketone | <28 |

From the foregoing, it is clear that cyclohexanone, xylene, and methyl isobutyl ketone are not suitable solvents for the trial system since their cloud points are less than 28° C., insufficiently far above ambient temperature to ensure substantially complete insolubility of resin at room temperature. The remaining solvents may be suitable from a solubility standpoint depending on the temperature of operation.

Resin solubility in solvents of the type described herein is characterized by increasing solubility at increasing temperatures. Thus, 5 wt. % ELVAX 40W EVA resin is completely soluble in all of the canditate solvents shown above at temperatures of 50° C. and above.

Other considerations such as toxicity, tendency to render paper substrates transparent, sorption into paper fibers, etc. will be considered by those skilled in the art in selecting solvents.

EXAMPLE 2

A series of ink compositions and control compositions containing no dyestuff were prepared utilizing DPM or TPM as solvents, various loading levels of ELVAX 40 W EVA resin, and various concentrations of Pigment Blue 15 dyestuff. The viscosities of the ink compositions were measured at various temperatures with a Brookfield Viscometer at varying spindle speeds. Cloud points for various compositions were also measured. Results are shown in Tables II and III, below.

TABLE II

| DPM Based Compositions | | | | |
|---|---|---|---|---|
| ELVAX 40 W EVA RESIN (Wt. %) | PIGMENT BLUE 15 (Wt. %) | TEMP. (°C.) | CLOUD POINT (°C.) | VISCOSITY (CPS) |
| 4% | — | 25 | 49 | 750-130[1] |
|  | — | 55 |  | 10 |
|  | — | 65 |  | 8 |
| 5% | — | 25 | 50 | 1200-161[1] |
|  | — | 55 |  | 13 |
|  | — | 65 |  | 11 |
| 6% | — | 25 | 49 | 4000-303[1] |
|  | — | 55 |  | 18 |
|  | — | 65 |  | 15 |
| 4% | 2.5% | 55 | 49 | 12 |
|  | 3% | 55 |  | 16[1] |
|  | 2.5% | 65 |  | 12 |
| 5% | 2.5% | 55 | 50 | 16 |
|  | 2.5% | 65 |  | 14 |
|  | 3.5% | 55 |  | 16 |
| 6% | 2.5% | 55 | 49 | 21 |
|  | 2.5% | 65 |  | 17 |
|  | 3.5% | 55 |  | 23 |
|  | 3.5% | 65 |  | 19 |
|  | 4.5% | 55 |  | 26 |
|  | 4.5% | 65 |  | 22 |

[1]NON-NEWTONIAN

TABLE III

| DPM Based Compositions | | | | |
|---|---|---|---|---|
| ELVAX 40 W EVA RESIN (Wt. %) | PIGMENT BLUE 15 (Wt. %) | TEMP. (°C.) | CLOUD POINT (°C.) | VISCOSITY (CPS) |
| 4% | — | 25 | 48 | 130-60[1] |
|  |  | 55 |  | 15 |
| 5% | — | 25 | 47 | 2000-580[1] |
|  |  | 55 |  | 17 |
|  |  | 65 |  | 13 |
| 6% | — | 23 | 47 | 3000-740[1] |
|  |  | 55 |  | 27 |
|  |  | 65 |  | 22 |
| 4% | 2.5% | 55 | 48 | 17 |
|  |  | 65 |  | 14 |
|  | 3.5% | 55 |  | 19 |
|  |  | 65 |  | 16 |
| 5% | 2.5% | 55 | 47 | 59-42[1] |
|  | 3.5% | 55 |  | 102-45[1] |

[1]NON-NEWTONIAN

The following are further ink compositions which are illustrative of the invention.

| SOLVENT | RESIN | | SURFACTANT |
|---|---|---|---|
| TPM | ELVAX 3.0-3.5% | Heliogen Blue L 7080 3.0-3.5% | A 0.3% |
| TPM | ELVAX 40W 4.95-5.5% | Litho Rubine 4.0-5.5% | A 0.27-0.3% |
| TPM | ELVAX 40W 4.4-5.5% | Carbon Black N234 4.8-6.0% | — |
| TPM | Vynathene 9050 4.4-5.5% | Carbon Black N234 4.8-6.0% | — |
| TPM | ELVAX 40W | Cyanamid Cyan | |

-continued

| SOLVENT | RESIN | SURFACTANT |
|---|---|---|
| 6.75% | 2-3% | — |

A is Dextrol OC-70

According to the invention, ink jet printing on plain paper may be effected by jetting the jet ink composition at a temperature at which the solution of the resin and dye is highly solvated by the solvent against a surface of a cellulosic substrate whereby the temperature of the ink is reduced below the cloud point, the solvent in the ink composition is absorbed into the substrate and the resin and dye in the ink precipitate or gel on the surface to form print.

The cellulosic substrate surface is preferably plain paper, i.e. paper which is substantially free of a pigment (e.g. silica) coating. Clay or silica fillers are acceptable but not required. Non-pigment coatings such as surface sizing, starch, etc. are acceptable.

The temperature at which the ink is jetted should be relatively low in order to allow rapid warming of ink, which in turn results in minimum strain on dye stability, and minimal energy consumption. The operation (nozzle) temperature is substantially above ambient temperature (e.g. 25° C.), and is generally a minimum of 35° C. and preferably in the range of 50°-65° C. Only the nozzle or the nozzle and actuator need be heated, so that low viscosity flow is obtained in this critical area.

The tack of the inventive ink increases at temperatures of about 50° C. and above, especially at temperatures above about 80° C. An increase in tack may increase the amount of energy required to move the ink within the printing system, despite the lower viscosity at higher temperatures. For this reason, it is desirable to heat only the nozzle or nozzle and actuator.

As the nozzle operating temperature (and thus the ink temperature) is decreased to about 40° C. and below, adherence of the ink to the paper substrate may decrease, and post-printing heating of the printed ink (but not the paper) may be desirable in order to increase adherence of the ink to the paper. This may be accomplished with a small infrared heater.

The foregoing detailed description is given for clearness of understanding only, and no unnecessary limitations should be understood therefrom, as modifications within the scope of the invention will be obvious to those skilled in the art.

With the preferred inks of the invention wherein the resin is ethylene/vinyl acetate copolymer and the solvent is DPM or TPM it has been found unexpectedly that the energy required to expel a drop of the ink from the print head, e.g. as measured by the voltage required to activate a piezoelectrically actuated ejection system, is substantially less than that expected from the measured viscosity of the ink at the relevant temperature, thereby providing a valuable saving in operating voltage and printhead costs.

The foregoing detailed description is given for clearness of understanding only, and no unnecessary limitations should be understood therefrom, as modifications within the scope of the invention will be obvious to those skilled in the art.

I claim:

1. An ink jet ink composition comprising a mixture of:
   (a) a non-aqueous solvent;
   (b) an amount of resin which is substantially insoluble in said solvent at room temperature but which is capable of being substantially completely dissolved in said solvent at a temperature in the range of about 50° C. to about 65° C.; and,
   (c) a dyestuff which is soluble in said resin at room temperature and above but substantially insoluble in said solvent at room temperature, the proportions of said solvent, resin, and dye being selected to provide an ink composition which is fluid at room temperature.

2. The ink composition of claim 1 wherein said resin is, in the amount in which it is employed, capable of being substantially completely dissolved in said solvent at a temperature in the range of about 45° C. to about 50° C.

3. The ink composition of claim 1 wherein said solvent is selected from the group consisting of paraffinic hydrocarbons, mixed paraffinic and naphthenic hydrocarbons, propylene glycol ethers, and ethylene glycol butyl ethers.

4. The ink composition of claim 3 wherein said solvent is selected from the group consisting of dipropylene and tripropylene glycol ethers.

5. The ink composition of claim 4 wherein said solvent is selected from the group consisting of dipropylene glycol monomethyl ether and tripropylene glycol monomethyl ether.

6. The ink composition of claim 3 wherein said resin is an ethylene-vinyl acetate copolymer.

7. The ink composition of claim 6 wherein said ethylene-vinyl acetate copolymer comprises at least about 35 wt. % vinyl acetate.

8. The ink composition of claim 7 wherein said ethylene-vinyl acetate copolymer comprises about 40 wt. % vinyl acetate.

9. The ink composition of claim 6 wherein said dyestuff is a pigment dye.

10. The ink composition of claim 6 wherein the said solvent is dipropylene glycol monomethyl ether and the weight ratio of said dyestuff to said resin is about 2:3 or below.

11. The ink composition of claim 6 wherein said solvent is tripropylene glycol monomethyl ether and the weight ratio of said dyestuff to said resin is about 0.75 or below.

12. The ink composition of claim 6 wherein said resin comprises about 7 wt. % or less of said composition.

13. The ink composition of claim 12 wherein said resin comprises about 5 to 7 wt. % of said composition.

14. The ink composition of claim 12 wherein the weight of said resin and said dye total about 10 wt. % or less of said composition.

15. The ink composition of claim 12 wherein the proportions of said solvent, said resin, and said dyestuff are selected to provide a composition viscosity of less than about 30 cps at 55° C. and above.

16. A method of forming an ink jet composition as claimed in claim 1, said method comprising the steps of
   (i) dissolving the resin in pre-heated solvent,
   (ii) adding the dyestuff to the solution so formed, and then
   (iii) quenching the composition while stirring it.

17. An ink jet ink composition comprising a mixture of:
   (a) a non-aqueous solvent;
   (b) an amount of resin which is capable of being substantially completely dissolved in said solvent at temperatures of about 50° C. and above but which is substantially insoluble in said solvent at room temperature; and,
(c) a dyestuff which is soluble in said resin at room temperature and above but substantially insoluble in said solvent at room temperature, the proportions of said solvent, resin, and dye being selected to provide an ink composition which is fluid at room temperature.

* * * * *